Oct. 16, 1923.
J. M. THORP
1,471,295
SIX-WHEEL PROPELLING MECHANISM FOR MOTOR VEHICLES
Filed Oct. 8, 1921
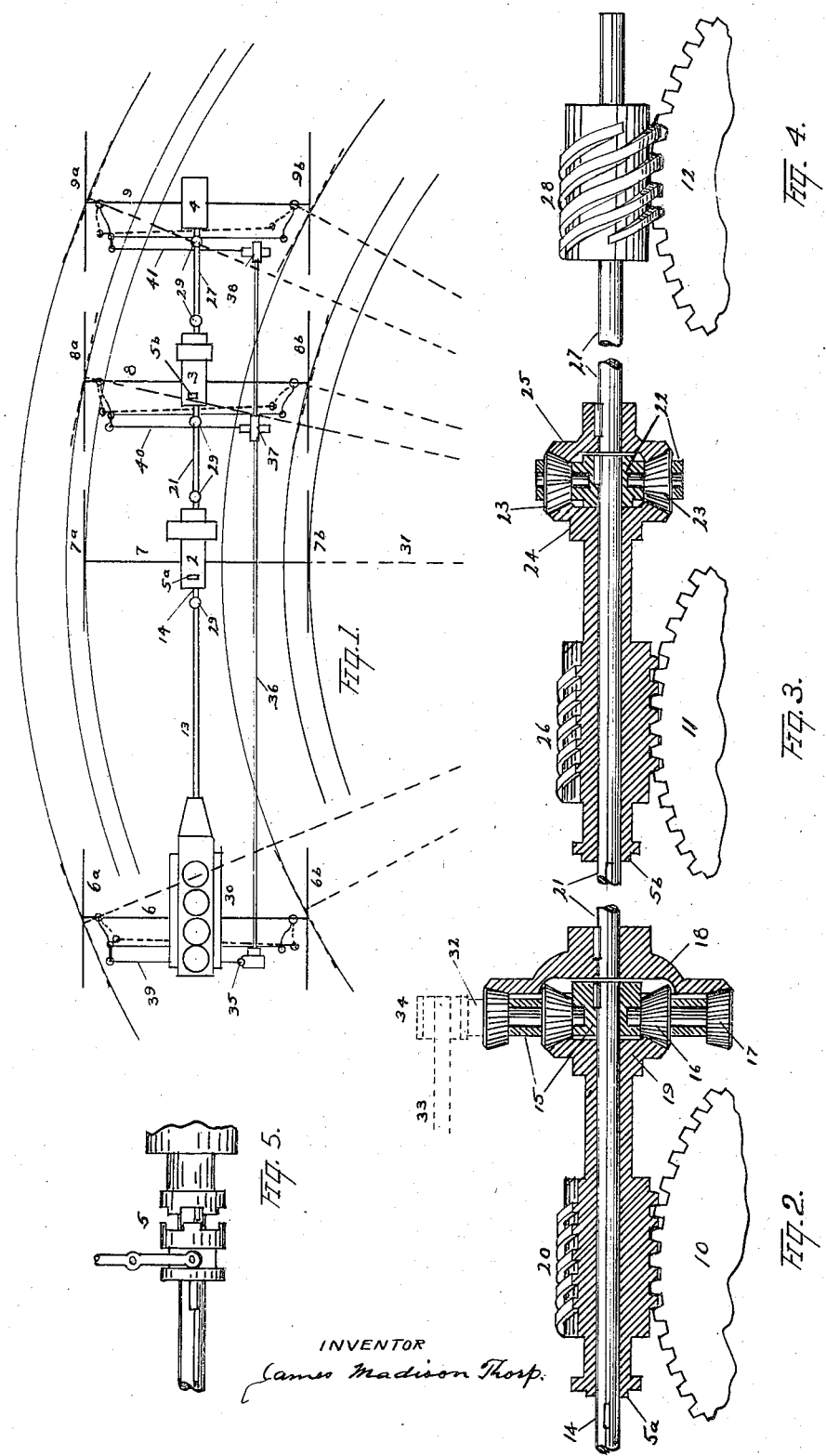
INVENTOR
James Madison Thorp.

Patented Oct. 16, 1923.

1,471,295

UNITED STATES PATENT OFFICE.

JAMES MADISON THORP, OF ALAMEDA, CALIFORNIA.

SIX-WHEEL PROPELLING MECHANISM FOR MOTOR VEHICLES.

Application filed October 8, 1921. Serial No. 506,385.

*To all whom it may concern:*

Be it known that I, JAMES MADISON THORP, a citizen of the United States, residing at Alameda, in the county of Alameda and State of California, have invented a new and useful Six-Wheel Propelling Mechanism for Motor Vehicles, of which the following is a specification.

Laws have been passed to limit the load of motor vehicles to a certain weight per inch of tire surface bearing upon the road, obviously then, the greater number of wheels the greater the load allowable.

The objects of this invention are, first, to provide a motor vehicle with large road bearing surface distributed over a considerable area of the road; second, to gain increased tractive power so that heavily loaded trailers may be towed by the motor unit; third, to so construct a motor vehicle that more speed can be had with less than the usual shock from humps and chuck holes; and fourth, by increasing the load and speed to decrease the proportionate cost of operation.

I attain the above objects by the mechanism and arrangement of parts illustrated in the accompanying drawings and described in the following specification and more particularly pointed out in the appended claims.

Figure 1 of the drawing is a diagram of an eight wheel motor vehicle with six driven wheels and six steering wheels, the solid lines indicate the wheels and axles when the vehicle is traveling a straight line, while the dotted lines denote the comparative steering movement of the wheels when turning upon the curves traveled by the different wheels; the numerals 2 3 4 indicate the casings or housings for the gearing shown in Figs. 2 3 4 respectively.

Figures 2 3 and 4 are detailed drawings of a three-way co-axial differential partly in section with portions of the line shafts broken out so as to draw the figures closer together; and Fig. 5 a side elevation of a clutch for locking the line shaft differentials in emergencies.

Similar characters of reference denote similar parts throughout the several views.

Referring to the diagram Fig. 1, 6 is the usual front axle of, let us say, a motor truck, $6^a$ and $6^b$ the wheels thereof which are provided with the usual steering devices; 7 is a driven axle with the usual differential mounted within the axle housing, its wheels $7^a$ $7^b$ are mounted without steering joints; 8 and 9 are third and fourth axles also provided with the usual differentials between wheels, both of these axles are, however, provided with driving and steering knuckles, and with steering levers similar to that of the front wheels.

The three rear axles are driven by worm gears 10 11 12 respectively, which are mounted on or are a part of the spider of the usual differentials in the axle housings between wheels. The propeller shaft 13 is flexibly connected to the shaft 14 by means of the universal coupling 29, the other end of the shaft 14 is keyed to the spider 15 upon which is mounted the inner and outer planet pinions 16 and 17, these pinions are made integral so that power applied to one will rotate the other, the pinion 16 is meshed with the gear 19 and the pinion 17 engages the larger gear 18. The gear 19 being integral with the hollow shaft and worm 20.

The shaft 21 is keyed to the gear 18 and to the second spider 22 upon which is mounted the planet pinions 23, these mesh with the gears 24 and 25; the gear 24 being integral with the worm 26; the shaft 27 is keyed to the gear 25 and to the worm 28. All these shafts and gears are provided with suitable housings shown at 2 3 4 Fig. 1, also with bearings which I have omitted as they tend to complicate the drawings; the flexible couplings are inserted in the shafts 21 and 27 just outside of each housing at 29 in the diagram.

It is obvious that a motor vehicle traveling in a straight line, with all wheels of the same diameter, will require no differential gearing, but as the vehicle turns to a curve the outer wheels travel faster and the inner ones slower than the average speed, so in practice a set of differential gears are inserted in the axle between wheels to compensate for this difference. Now, with a vehicle of more than two driven wheels it is necessary to steer certain of the driven wheels and at the same time to make them run true without dragging and some wheels must be turned more than others as shown in dotted lines Fig. 1; thus $6^e$ and $9^a$ are turned in their respective directions and to a like degree, while $8^a$ takes another course on a lesser circle and requires less steering movement, it follows then, that the axle 9 and its wheels must travel faster than the axle 8 and its wheels, so again the axle 7 and wheels travel still slower; therefore, a three-way line shaft differential set is required to compensate for these several speeds and the mechanism shown in Figs. 2 3 and 4 functions to that end, the same embodying the principal part of the present invention and this application; the other features here shown are merely to assist the description and are not included in the appended claims but will form the subject of another application.

Again referring to Fig. 1, 35 denotes the usual steering column, it operates the shaft 36 and the mechanism located in the housings 37 and 38, and through such mechanism and the steering rods 39 40 41 the several pairs of wheels are steered as described.

In operation; power from the motor 30 is transmitted through the shaft 13 and section 14 to the spider 15, the pinions 16 and 17 not turning on their axis but being meshed with the gears 18 and 19 will rotate them both at the same speed and thus the motion is transmitted from the gear 19 to the worm 20, gear 18 and shaft 21 to the second spider 22 which in turn rotates the pinions around the axis of the shaft section 21 and carrying with them the gears 24 and 25 the terminal shaft 27 and worms 26 and 28, thus all three axles through their respective worm wheels 10 11 12 are rotated at the same speed.

It is obvious however, that when a turn is made as in Fig. 1, the axle 7, traveling on the smallest circle, will lag in speed, relatively turning backward the gear 19 and worm 20 and through the pinions 16 and 17 rotating the gear 18 forward which carries along the shaft 21 and second spider 22 and pinions 23. Now, due to the difference in the circles upon which the respective wheels travel the axle 8, although being speeded above that of axle 7 will also tend to lag below the speed of axle 9, then the gear 24 relatively turns backward and through the pinions 23 will force the gear 25 forward to the required speed, thus compensation of the three different speeds are accomplished.

It is to be specially noted that in compensating gearing between two elements the stresses on each of the elements are equal, whereas, in the three-way differential as shown the axle 7 is required to hold, by the tractive power of its wheels, the combined tractive power of the four wheels operated from the axles 8 and 9, for this reason the gear 19 is but half the diameter of the gear 18, thereby giving to the axle 7 a double purchase sufficient to equal in holding power or to drive the other two axles.

It sometimes happens in practice that one or more wheels of a motor vehicle will run into a soft or slippery spot which allows that particular wheel to slip around, thus all the wheels connected through the differentials will lose their traction, in such case the differential lock Fig. 5, which is to be mounted at 5ª and 5ᵇ Figs. 1, 2 and 3, is thrown into engagement to lock the shafts 14 and 21 to the worms 20 and 26, thereby temporarily nullifying the function of the three-way differential and holding all three axles to the same speed until the wheels are again on firm ground.

Attention is called to the spacing of the axles wherein axle 7 is placed midway between the two outer ones so that in turning the vehicle this center axle remains on the radial line 31 and requires no steering, while the steering levers are so arranged as to swing each of the other wheels at right-angles to its particular radial line, that all radial lines converge to meet a common center with that of the line 31. With a vehicle so designed the wheels will run smoothly without unnecessary wear on the tires.

While I have herein shown the preferred manner of attaining my objects, it is understood that variations may be resorted to in the adaptation of the invention to various requirements, such as extending the spider 15 to form the gear 32 and applying the propelling power to the gear through the shaft 33 and pinion 34 instead of through the coaxial shafts 13 and 14.

I therefore reserve the rights to all such variations and modifications as fall within the scope of my invention and the terms of the following claims.

I claim:

1. A three-way differential, comprising a propeller shaft, a spider shaft flexibly connected thereto, a spider fixed to one end of said spider shaft, integrally made inner and outer planet pinions mounted upon said spider, an integrally made gear, worm and hollow shaft rotatably mounted on said spider shaft, said gear meshing with the inner planet pinions, a second gear meshing with the outer planet pinions and fixed to one end of a second spider shaft, a second spider fixed upon the other end of said second spider shaft, planet pinions mounted upon the second spider, a third gear meshed with the pinions on said second spider, a second worm and hollow shaft made integral with said third gear and rotatably mounted upon the second spider shaft, a fourth gear meshed with the pinions on said second spider, a terminal shaft keyed to a third worm and to said fourth gear, worm gears engaging all of said worms, and bearings and housings for all of said shafts and gears.

2. In differential gearing, a propeller shaft, sectional shafts coaxially mounted therewith, a worm, and a gear of relatively small diameter rotatably mounted upon one of the sectional shafts, a spider fixed to the last named shaft, inner and outer planet pinions mounted upon said spider, said inner pinions meshing with said relatively small gear and said outer pinions meshing with a gear of greater diameter than the last named gear, said greater gear being fixed to a second spider shaft upon which are mounted planet pinions, and gears meshing with said planet pinions whereby power is transmitted to second and third worms.

3. In differential gearing, a propeller shaft, sectional shafts coaxially mounted with said propeller shaft, worms and gears rotatably mounted upon said sectional shafts, spiders fixed to said shafts, planet pinions mounted upon said spiders, said planet pinions meshing with said gears, and said worms in operative engagement with rotatably mounted worm gears.

4. In differential gearing, a propeller shaft, sectionally mounted coaxial shafts, worms and gears rotatably mounted upon said sectional shafts, spiders fixed to said shafts, planet pinions mounted upon said spiders, said planet pinions meshing with said gears, said worms in operative engagement with rotatably mounted worm gears, and means for locking said shafts and gears against separate rotation.

5. In differential gearing, a propeller shaft, a pinion thereon meshing with a spider gear, inner and outer planet pinions mounted upon said spider gear, a gear meshing with said inner pinions and made integral with a shaft and worm, a gear meshing with said outer pinions and fixed to a second shaft whereby differential movement is had between said worm and said second shaft.

6. In differential gearing, a propeller shaft, a pinion thereon meshing with a spider gear, inner and outer planet pinions mounted upon said spider gear, a gear meshing with said inner planet pinions and made integral with a shaft and worm, a gear meshing with said outer pinions and fixed to a second shaft whereby differential movement is had between said worm and said second shaft, one of said gears being of greater diameter than the other, as described.

JAMES MADISON THORP.